(12) United States Patent
Minato et al.

(10) Patent No.: US 9,421,889 B2
(45) Date of Patent: Aug. 23, 2016

(54) CHILD SAFETY SEAT

(71) Applicant: Clek Inc., Toronto (CA)

(72) Inventors: Ray Minato, Toronto (CA); Yunzhen Zhou, Toronto (CA); Christopher Leiphart, Toronto (CA); Iuliu Vig Dinescu, Toronto (CA)

(73) Assignee: Clek Inc., Toronto, ON (CA)

( * ) Notice: Subject to any disclaimer, the term of this patent is extended or adjusted under 35 U.S.C. 154(b) by 0 days.

(21) Appl. No.: 14/346,918

(22) PCT Filed: Sep. 24, 2012

(86) PCT No.: PCT/CA2012/000883
§ 371 (c)(1),
(2) Date: Mar. 24, 2014

(87) PCT Pub. No.: WO2013/040692
PCT Pub. Date: Mar. 28, 2013

(65) Prior Publication Data
US 2014/0232152 A1    Aug. 21, 2014

Related U.S. Application Data

(60) Provisional application No. 61/537,842, filed on Sep. 22, 2011.

(51) Int. Cl.
*B60N 2/28* (2006.01)
*B60N 2/42* (2006.01)
*B60N 2/427* (2006.01)

(52) U.S. Cl.
CPC .............. *B60N 2/42* (2013.01); *B60N 2/286* (2013.01); *B60N 2/2809* (2013.01); *B60N 2/289* (2013.01); *B60N 2/2812* (2013.01); *B60N 2/2821* (2013.01); *B60N 2/2824* (2013.01);
(Continued)

(58) Field of Classification Search
CPC .. B60N 2/2821; B60N 2/286; B60N 2/2875; B60N 2/2863; B60N 2/2884; B60N 2/2887
See application file for complete search history.

(56) References Cited

U.S. PATENT DOCUMENTS 5,052,750 A * 10/1991 Takahashi ............ B60N 2/2821
297/256.13
5,664,830 A *  9/1997 Garcia ................. B60N 2/2821
297/216.11

(Continued)

FOREIGN PATENT DOCUMENTS

CA         2214681 C  * 12/2001
DE    102004022316 A1    11/2005

(Continued)

OTHER PUBLICATIONS

European Search Report on PCT/CA2012000883, dated Jul. 7, 2015, 6 pages.

(Continued)

*Primary Examiner* — Ryan Kwiecinski
(74) *Attorney, Agent, or Firm* — Greenberg Traurig, LLP

(57) ABSTRACT

A child safety seat includes a seat base assembly, a sled assembly coupled to the seat base assembly, and a seat body assembly slidably coupled to the sled assembly. The sled assembly includes a modular energy absorber that is configured to reduce impact forces on an occupant of the seat body.

25 Claims, 12 Drawing Sheets

(52) U.S. Cl.
CPC ........... *B60N2/2851* (2013.01); *B60N 2/2863* (2013.01); *B60N 2/2875* (2013.01); *B60N 2/2884* (2013.01); *B60N 2/2887* (2013.01); *B60N 2/427* (2013.01); *B60N 2/4221* (2013.01); *B60N 2/42709* (2013.01); *B60N 2/42736* (2013.01)

(56) References Cited

U.S. PATENT DOCUMENTS

| | | | |
|---|---|---|---|
| 5,890,762 A | 4/1999 | Yoshida | |
| 6,779,843 B2 * | 8/2004 | Kain | B60N 2/2812 297/250.1 |
| 7,073,859 B1 * | 7/2006 | Wilson | B60N 2/0232 297/250.1 |
| 2004/0070246 A1 * | 4/2004 | Adachi | B60N 2/2806 297/256.12 |
| 2006/0273640 A1 * | 12/2006 | Kassai | B60N 2/2806 297/256.16 |
| 2010/0225150 A1 * | 9/2010 | Duncan | B60N 2/2806 297/256.12 |
| 2011/0062756 A1 * | 3/2011 | Campbell | B60N 2/2812 297/250.1 |
| 2011/0227376 A1 * | 9/2011 | Franck | B60N 2/2809 297/216.11 |
| 2011/0227383 A1 * | 9/2011 | Strong | B60N 2/2806 297/250.1 |
| 2013/0175832 A1 * | 7/2013 | Cheng | B60N 2/2821 297/216.11 |

FOREIGN PATENT DOCUMENTS

| | | |
|---|---|---|
| EP | 2161160 A1 | 3/2010 |
| WO | 2009/062505 A1 | 5/2009 |

OTHER PUBLICATIONS

First Office Action re CN Application No. 2012800546062, dated Oct. 30, 2015, 18 pages.

* cited by examiner

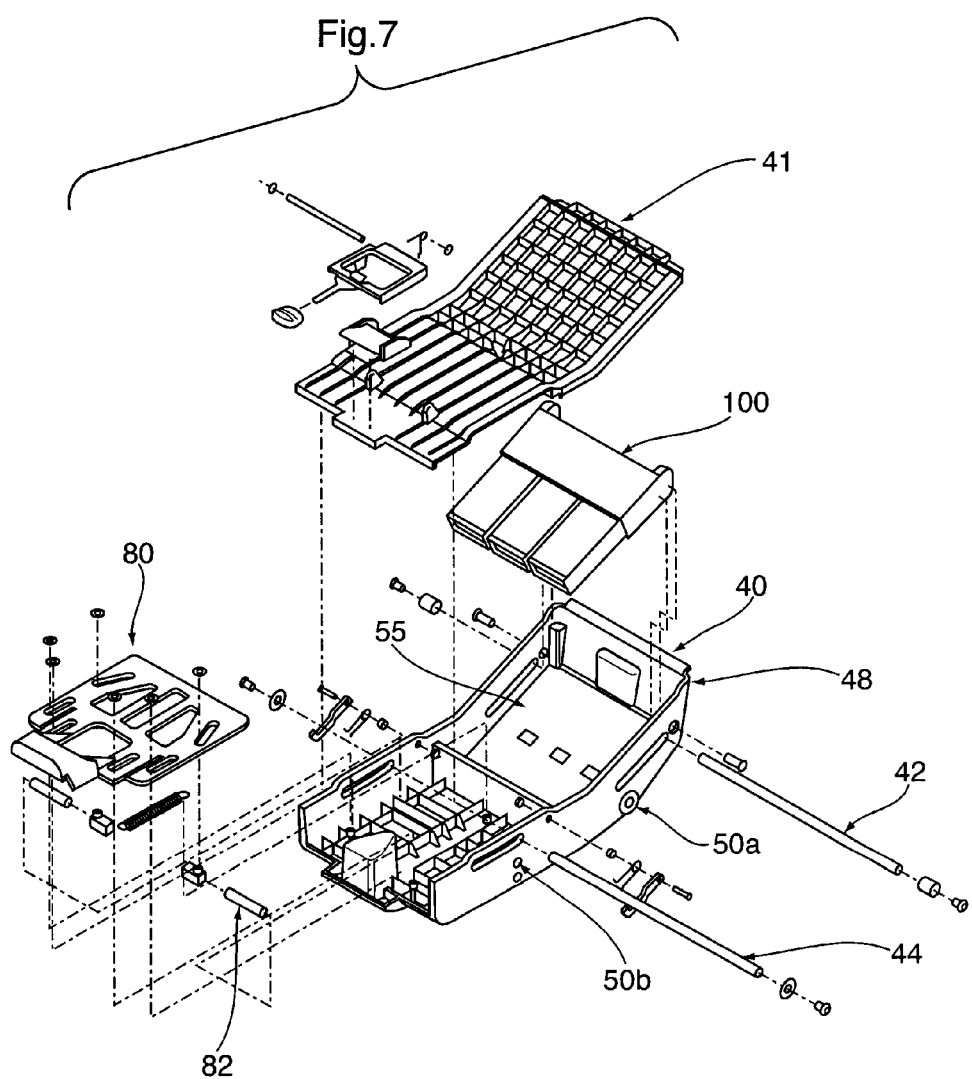

CHILD SAFETY SEAT

RELATED APPLICATIONS

This patent application claims the benefit of the filing date of U.S. patent application Ser. No. 61/537,842, entitled "Child Safety Seat", filed Sep. 22, 2012.

FIELD OF THE INVENTION

This patent application relates to a safety seat intended for installation in an automotive vehicle, and particularly relates to a child safety seat having an impact absorbing mechanism that can reduce impact forces upon a seat occupant.

BACKGROUND

Children traveling in a motor vehicle are particularly vulnerable to injury from impact forces when the vehicle stops suddenly. Efforts have been made to develop child safety seats that reduce the effect of these forces on the child. Infants are required to ride in a rear-facing child safety seat to allow impact forces on the child's body to be absorbed by the padding of the child seat.

An older, more robust, child may ride in a front-facing seat. In a front-facing seat, typically a multiple-point harness secures the child into the seat. Although the child may be retained in the seat upon vehicle impact, the straps themselves can cause injury by digging into the child. In addition certain parts of the child's body, such as the child's head and neck, are not secured by straps and may be exposed to whiplash forces.

It is therefore desirable to reduce the impact forces that are transferred to a child's body when the vehicle stops suddenly.

SUMMARY

As described in this patent application, there is provided a child safety seat that includes a seat base assembly, a sled assembly that is coupled to the seat base assembly, and a seat body assembly that is slidably coupled to the sled assembly. The sled assembly includes a modular energy absorber that is configured to reduce impact forces on an occupant of the seat body.

The modular energy absorber may comprise an impactor piston and a monolithic energy absorbing member, and the impactor piston may be configured to move relative to the sled assembly, towards the energy absorbing member, as the seat body assembly moves relative to the sled assembly. The modular energy absorber may be configured to provide a step-wise-increasing form of energy absorption as the seat body assembly moves relative to the sled assembly. Further, the modular energy absorber may include a skirt surrounding an end of the energy absorbing member and configured to maintain the impactor piston in alignment with the energy absorbing member.

In one implementation, the sled assembly comprises a pair of sled side walls, a sled floor, a rear end wall disposed proximate a rear of the seat, and an intermediate wall disposed proximate a front of the seat. The modular energy absorber is disposed within a sled assembly compartment defined by the sled side walls, the rear end wall, the intermediate wall and the sled floor. The sled assembly may be covered by a sled cover, and the impactor piston may be constrained against rotation within the sled assembly compartment by the sled floor and a lower surface of the sled cover.

The energy absorbing member may be supported by the sled floor, and the impactor piston may be configured to translate along a plane that is parallel to the sled floor as the seat body assembly moves relative to the sled assembly. The sled side walls may include elongate channels, and the impactor piston may be configured to translate linearly along the elongate channels, towards the energy absorbing member, along the plane as the seat body assembly moves relative to the sled assembly. The impactor piston may include an impactor channel extending therethrough, and the seat body assembly may be coupled to the sled assembly via a rod that extends through the elongate channels and the impactor channel.

In one implementation, an end of the impactor piston includes a plurality of impactor stages that engage an end of the energy absorbing member, each impactor stage being configured to transfer energy to the energy absorbing member at different rates. A first of the impactor stages may comprise a primary planar impactor surface disposed proximate the centre of the impactor piston and configured to transfer energy to a first portion of the energy absorbing member. A second of the impactor stages may comprise a pair of secondary planar impactor surfaces disposed on opposite sides of the primary impactor face and configured to transfer energy to a second portion of the energy absorbing member.

The second of the impactor stages may be configured to begin transferring energy to the second portion of the energy absorbing member after the first of the impactor stages begins transferring energy to the first portion of the energy absorbing member. Further, the impactor piston may be configured to deform the energy absorbing member at a lower axial rate when the second of the impactor stages engages the energy absorbing member than when only the first of the impactor stages engages the energy absorbing member. The energy absorbing member may include slits aligned with a lateral extent of the first of the impactor stages and configured to confine forces applied to the energy absorbing member by the first of the impactor stages to the first portion of the energy absorbing member.

In one implementation, the sled assembly comprises a pair of sled side walls, the seat base assembly comprises a pair of base side walls located laterally outwards from the sled side walls, each sled side wall includes a plurality of through-holes, and each base side wall includes a plurality of arcuately-shaped base channels each aligned with a respective one of the through-holes. The sled assembly may include rods each extending through a respective one of the through-holes and captured within a respective one of the base channels and configured to allow the sled assembly to move relative to the seat base assembly. Preferably, the orientation of the base channels allows the incline angle of the seat assembly to be manually adjusted.

In one implementation, the sled side walls include elongate channels disposed in respective regions thereof, and the seat body assembly is secured to the sled assembly via rods extending through the elongate channels. Each rod may be slidably retained within a respective one of the elongate channels, and the seat body assembly may be configured to translate linearly relative to the sled assembly via the rods and the elongate channels.

The seat may be used both as rear-facing safety seat and a front-facing safety seat.

BRIEF DESCRIPTION OF THE DRAWINGS

The child safety seat will now be described, by way of example, with reference to the accompanying drawings, in which:

FIG. 7 is a front perspective exploded view of the sled assembly;

DETAILED DESCRIPTION

Figure 1:
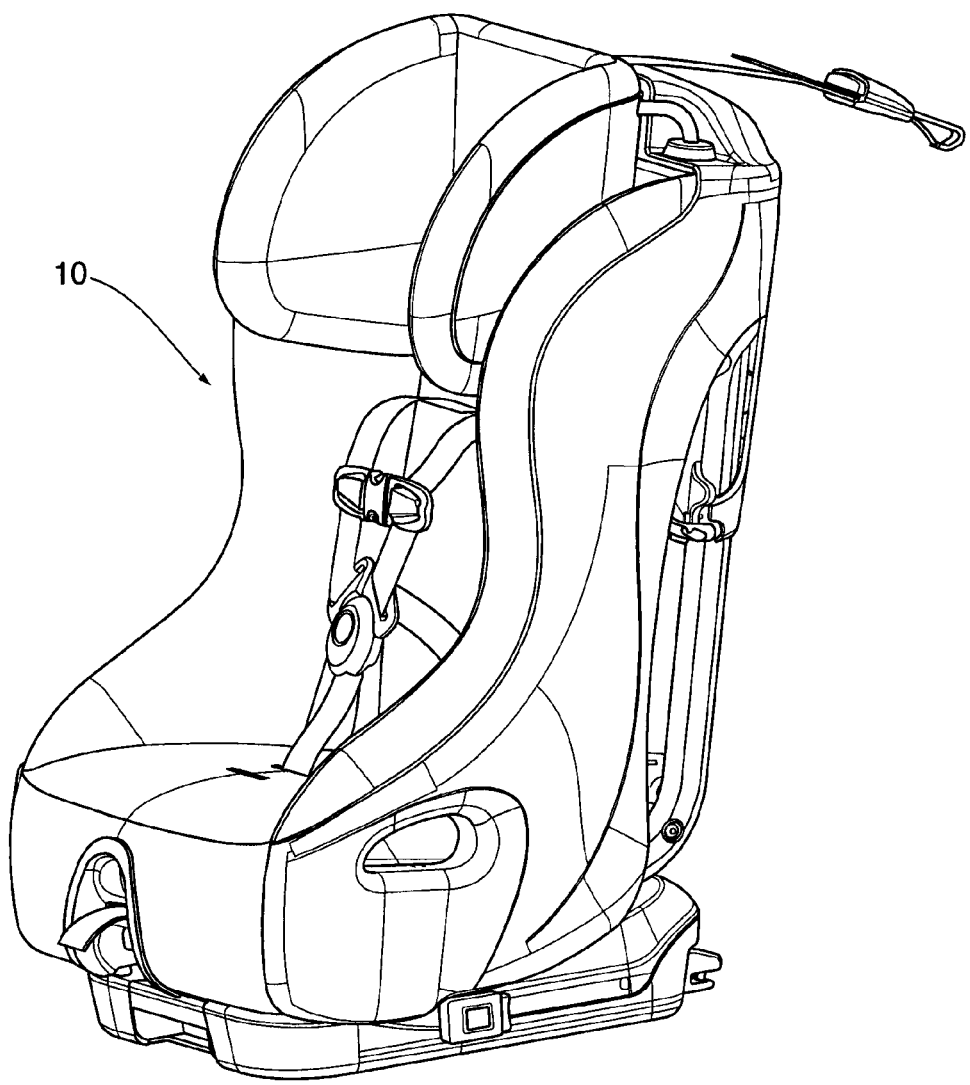
FIG. 1 is a front perspective view of the child safety seat.
Figure 2:
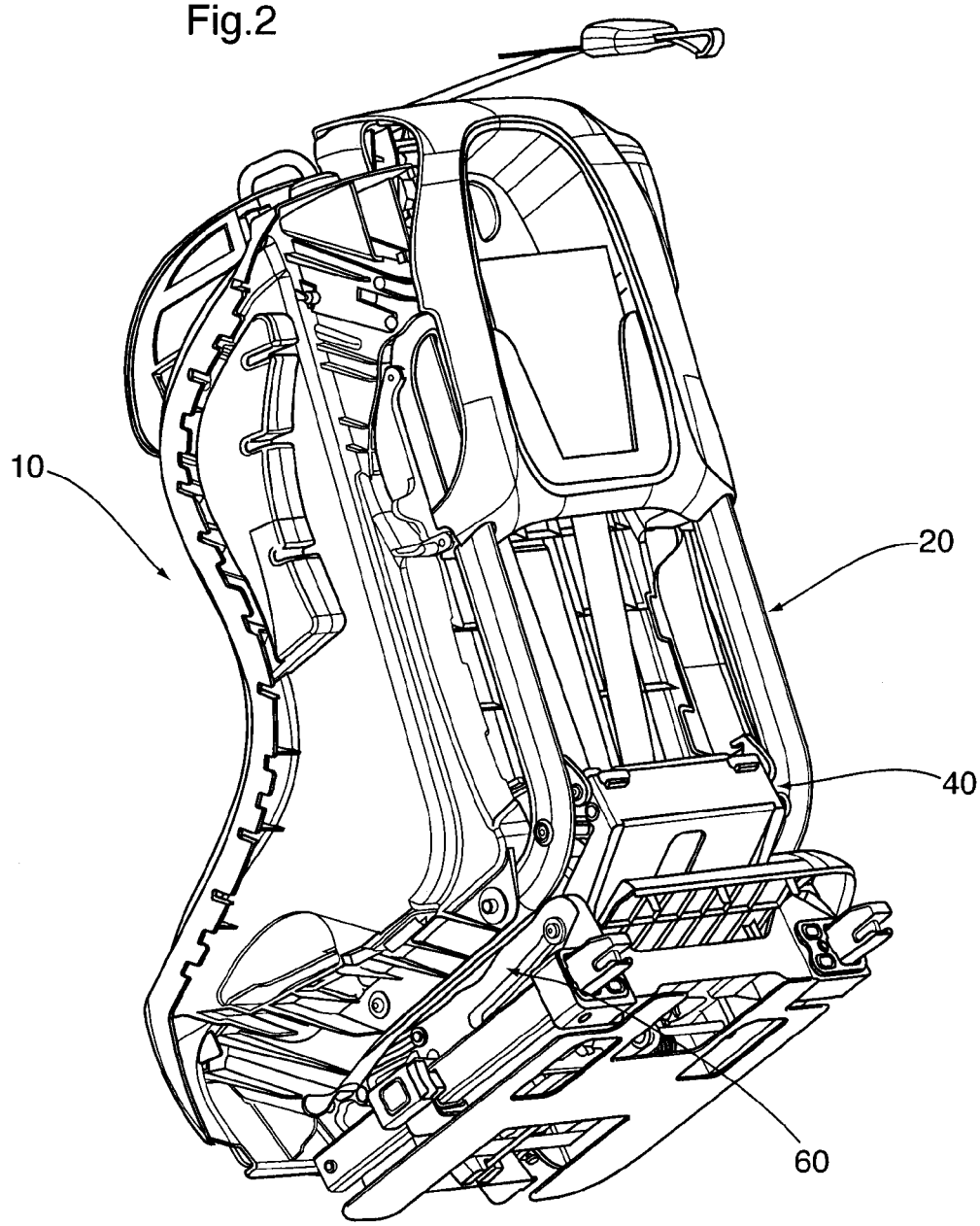
FIG. 2 is a rear perspective view of the child safety seat, depicted without certain exterior features.

In FIG. 1, there is shown a fully assembled child safety seat 10 intended for installation in a motor vehicle, such as a car or truck. In FIG. 2, the seat 10 is depicted without certain exterior features to thereby show some internal features of the seat 10. It should be understood, however, that it might not be possible to actually configure the finished seat 10 in the manner shown, at least without damaging the seat 10.

Figure 3:
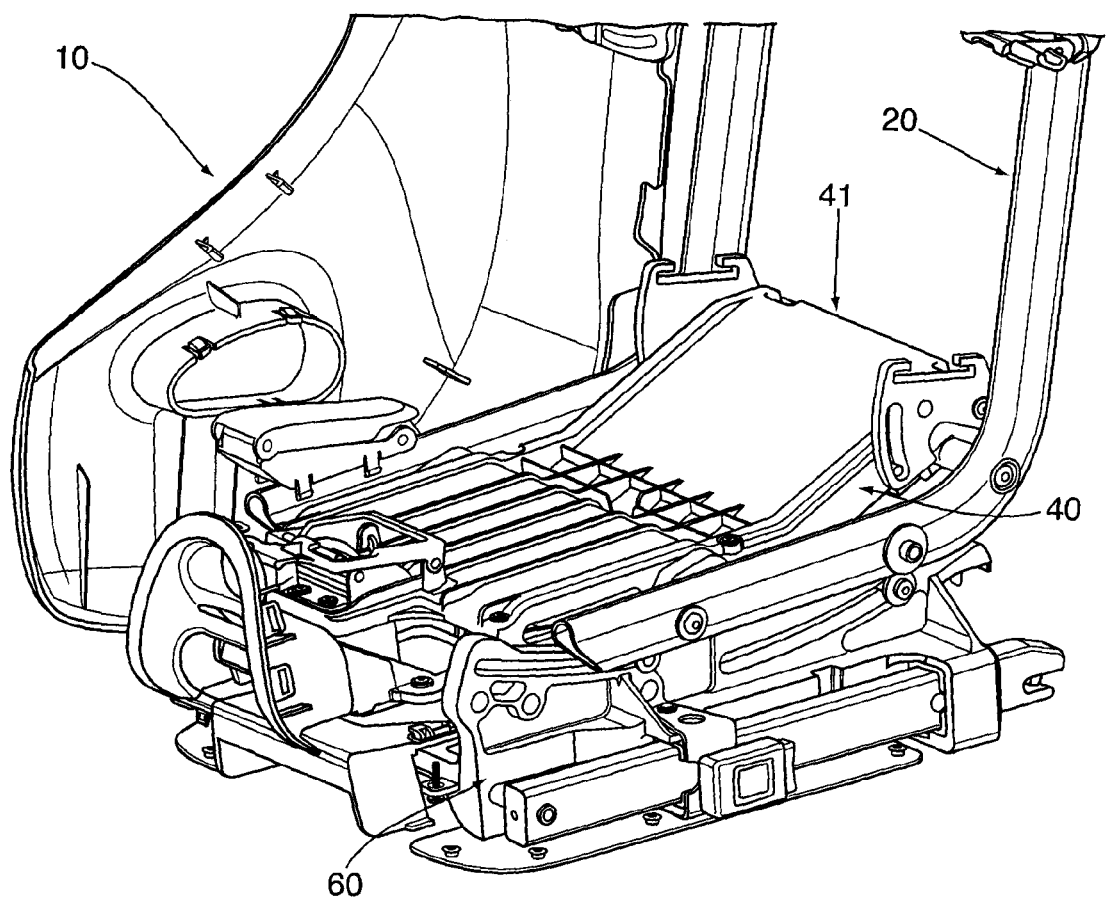
FIG. 3 is a side perspective view of the child safety seat of FIG. 2, depicting the sled assembly and the seat base assembly.

As shown in FIG. 3, the seat 10 comprises a seat body assembly 20, a sled assembly 40, and a seat base assembly 60. As will be explained, the sled assembly 40 is connected to the seat body assembly 20 and the seat base assembly 60. When the seat 10 is mounted as a rear-facing safety seat, the seat 10 may be secured to the vehicle by passing the vehicle seat belts through the seat body assembly 20. When the seat 10 is mounted in the vehicle as a front-facing safety seat, the seat 10 is secured to the vehicle via the seat base assembly 60. Further, in this latter mode, the sled assembly 40 may allow the seat body assembly 20 to move relative to the seat base assembly 60 when the seat 10 is exposed to impact forces.

Figure 4:
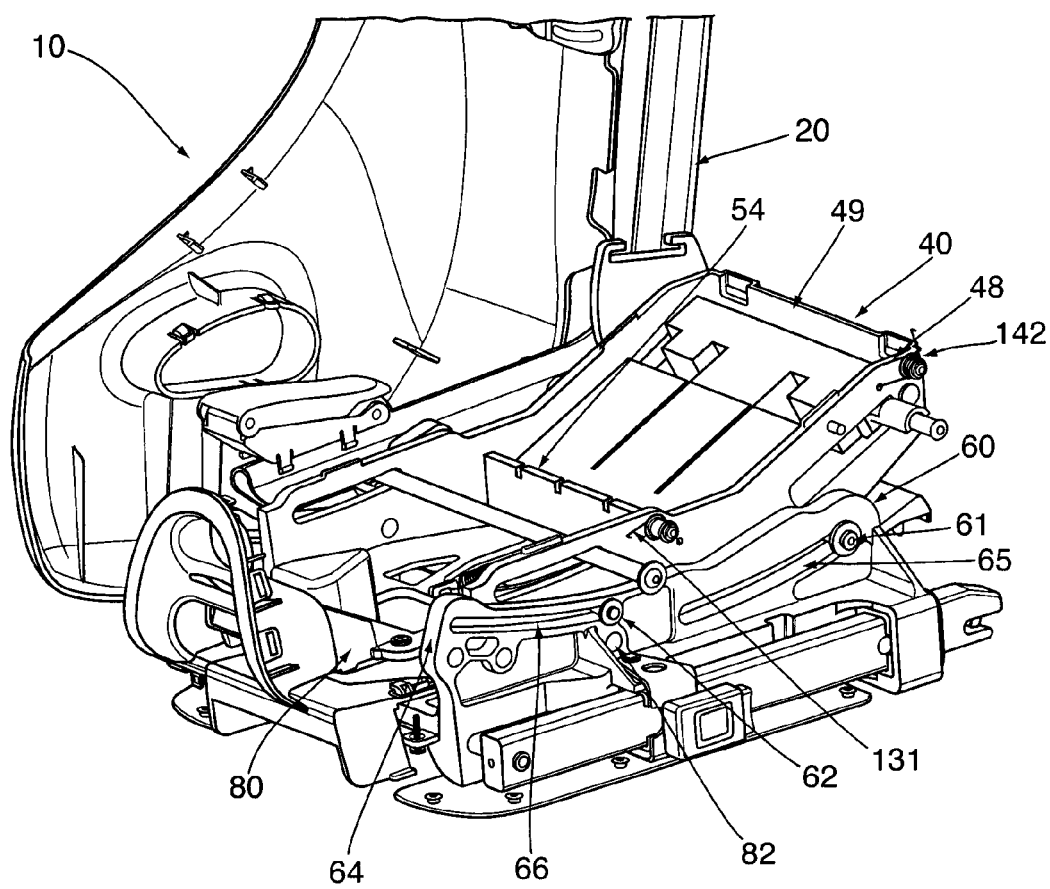
FIG. 4 is a side perspective view of the child safety seat of FIG. 3, depicting additional features of the sled assembly.

In FIG. 3, the seat 10 is shown without most of the features of the seat body assembly 20 to better show the sled assembly 40 and the base assembly 60. The sled assembly 40 is shown in FIG. 3 covered by a sled cover 41 that is mounted to a top side of the sled assembly 40 and conceals the internal features of the sled assembly 40. The seat 10 is shown in FIG. 4 without the sled cover 41 and a remaining feature of the seat body assembly 20 to thereby provide a more unobstructed view of the sled assembly 40 and the seat base assembly 60. Again, it might not be possible to actually configure the finished seat 10 in the manner shown, at least without damaging the seat 10.

As shown in FIG. 4, the sled assembly 40 may comprise a pair of substantially parallel upright sled side walls 48, a sled floor 55 (see FIG. 7), a rear upright end wall 49 that is disposed proximate the rear of the seat 10, and an upright intermediate wall 54 (see also FIG. 6) that is disposed proximate the front of the seat 10. Preferably, the sled floor 55, the end wall 49 and the intermediate wall 54 rigidly interconnect the two sled side walls 48. Further, preferably the end wall 49 and the intermediate wall 54 are disposed substantially parallel to each other. Each sled side wall 48 may preferably comprise identical structural features.

The base assembly 60 preferably comprises a pair of substantially parallel upright base side walls 64 that are located laterally outwards from the sled side walls 48 and capture the sled assembly 40 therebetween. While elements may be described herein with respect to only one sled side wall 48 or base side wall 64, it should be understood that similar or identical elements may be present in the respective matching opposing sled side wall 48 or base side wall 64 as well.

Each sled side wall 48 includes a rear sled cylindrical through-hole 50a and a front sled cylindrical through-hole 50b (see FIG. 7), and each base side wall 64 includes a rear arcuately-shaped base channel 65 and a front arcuately-shaped base channel 66 each aligned with a respective one of the sled through-holes 50a, 50b. The sled assembly 40 includes first and second cylindrical base rods 61 and 62 that extend respectively through the rear and front base channels 65, 66 (and the rear and front through-holes 50a, 50b). To prevent the base rods 61, 62 from being dislodged from the base channels 65, 66, the base rods 61, 62 may be secured in place by securing hardware provided in the ends of the base rods 61, 62.

The base rods 61, 62 are slidingly captured within the base channels 65, 66 to thereby allow the base rods 61, 62 to be guided along the length of the base channels 65, 66 and allow the sled assembly 40 to be moved relative to the seat base assembly 60. As shown in FIG. 4, the orientation of the rear base channel 65 is different from the orientation of the front base channel 66 such that as the first base rod 61 slides downwards within the rear base channel 65, the second base rod 62 slides upwards within the rear base channel 66 and the sled assembly 40 rotates about an axis that is parallel to the rods 61, 62. Therefore, movement of the sled assembly 40 via the base channels 65, 66 allows the incline angle of the seat assembly 20 to be manually adjusted.

Figure 5:
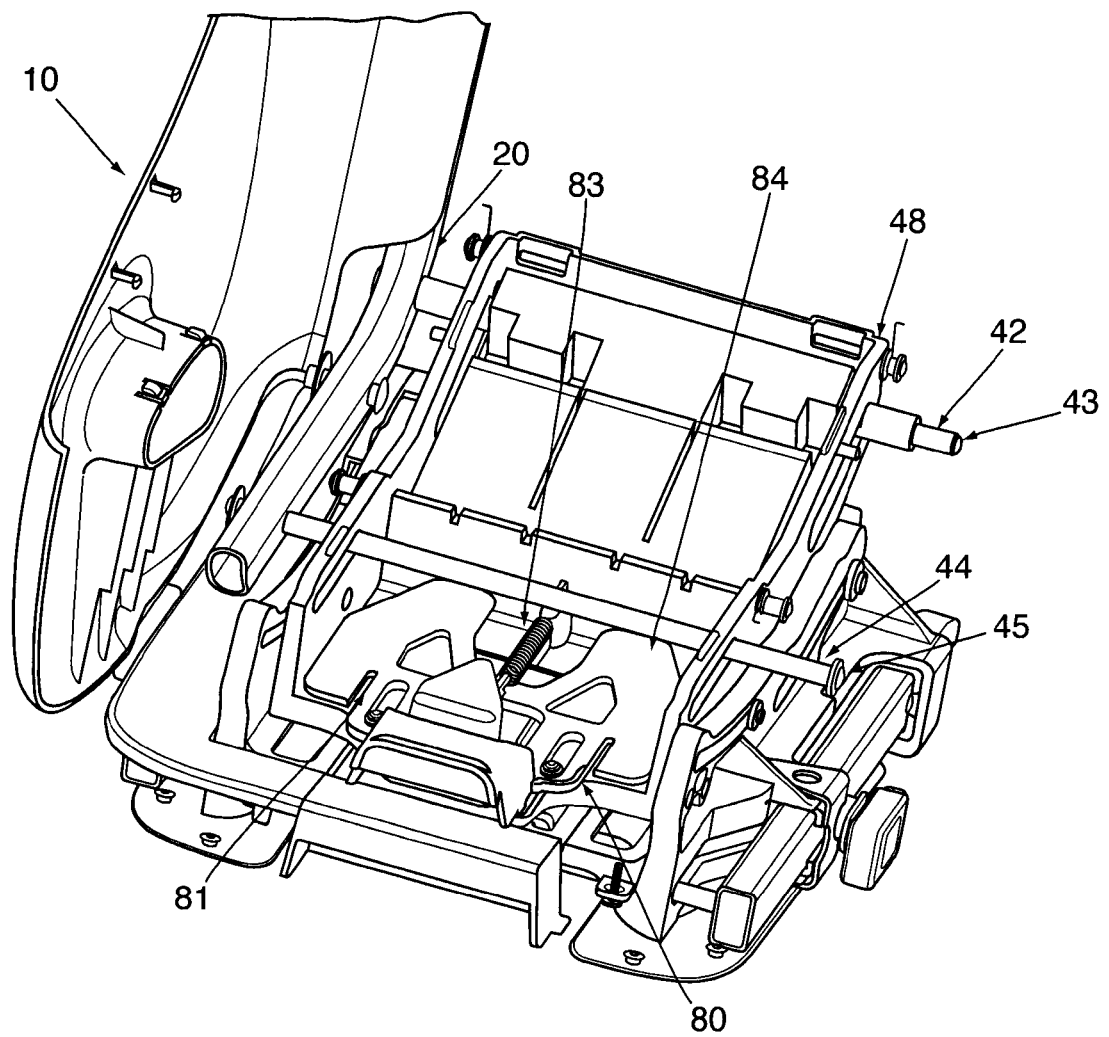
FIG. 5 is a front perspective view of the child safety seat of FIG. 4.
Figure 6:
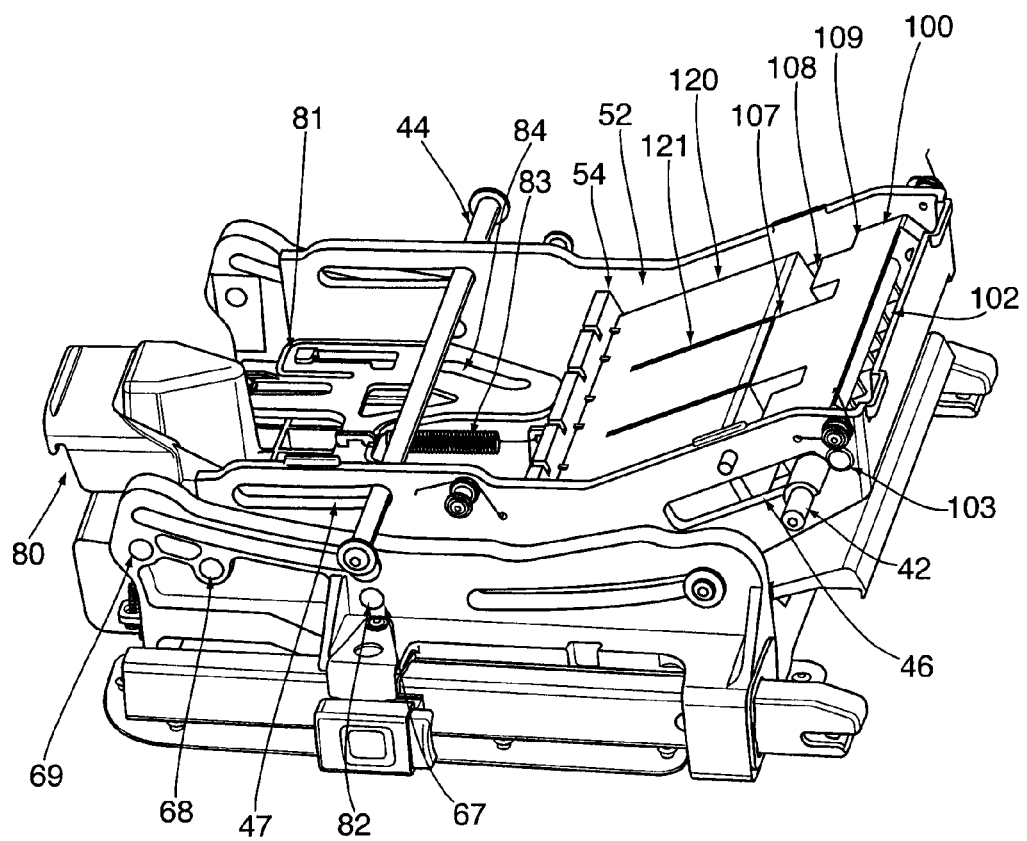
FIG. 6 is a side perspective view of the sled assembly and the seat base assembly.

To prevent uncontrolled movement of the sled assembly 40 relative to the seat base assembly 60, preferably the seat 10 also includes a sled locking assembly 80 that retains the sled assembly 40 in one of a plurality of predetermined angular positions. As shown in FIGS. 5 and 6, the sled locking assembly 80 may be configured as an A-lock that comprises an A-shaped planar guide plate 81, a pair of locking pins 82 (see FIG. 4), and a biasing spring 83. The planar guide plate 81 is disposed between the sled side walls 48 and includes a pair of substantially parallel sides (each proximate one of the sled side walls 48), and a pair of guide channels 84 each extending at approximately a 45 degree angle from the proximate sled side wall 48 and a position interior to the guide plate 81. Preferably, each base side wall 64 includes a plurality of locking apertures 67, 68, 69 which are spaced apart sufficiently to provide the seat assembly 20 with three distinct incline positions. Each locking pin 82 includes a head that is captured within a respective one of the guide channels 84. The locking pins 82 extend from the respective guide channel 84 (through an aperture in the slide side wall 48) into one of the locking apertures 67, 68, 69.

The biasing spring 83 is coupled to the guide plate 81 and biases the guide plate 81 into a first position in which the locking pins 82 are urged laterally outwards (via the guide channels 84) into one of the locking apertures 67, 68, 69. In order to change the position of the sled assembly 40 with respect to the base assembly 60, the guide plate 81 may be pulled axially outwards, into a second position, against the biasing force of the sled locking spring 83, to thereby withdraw the locking pins 82 from the locking apertures 67, 68, 69 (via axial movement of the guide channels 84). The sled assembly 40 may then be manually rotated relative to the seat base assembly 60, and then locked in the new position by allowing the guide plate 81 to return to the first position.

Where locking pins 82 are retained in the locking apertures 67, the seat assembly 20 is oriented in a substantially vertical non-reclined position. Where locking pins 82 are retained in the locking apertures 68, the seat assembly 20 is oriented in a partially reclined position. Where locking pins 82 are retained in the locking apertures 69, the seat assembly 20 is oriented in a substantially horizontal reclined position.

As shown FIGS. 5 and 6, the seat body assembly 20 includes a pair of first elongate slide channels 46 each disposed in a rear portion of a respective one of the sled side walls 48, and a pair of second elongate slide channels 47 each disposed in a front portion of a respective one of the sled side walls 48. The seat 10 also includes a first slide rod 42 that extends through the pair of first slide channels 46, and a second slide rod 44 that extends through the pair of second slide channels 47. The seat body assembly 20 is secured to the slide rods 42, 44 via mounting hardware 43, 45 that is disposed at the respective ends thereof.

Preferably, each slide channel 46, 47 includes a pair of planar side walls that are parallel to each other, and each slide rod 42, 44 is slidably retained within the respective slide channel 46, 47. Therefore, the seat body assembly 20 is slidably coupled to the sled assembly 40 via the slide rods 42, 44 and the slide channels 46, 47, and can translate linearly relative to the sled assembly 40.

As shown in FIG. 6, the sled assembly 40 includes a sled assembly compartment 52, and a modular energy absorber that is disposed within the compartment 52. The compartment 52 comprises the region within sled assembly 40 that is defined by the sled cover 41, the sled side walls 48, the rear end wall 49, the intermediate wall 54 and the sled floor 55. The sled floor 55 is substantially planar within the compartment 52 (see FIG. 7).

Figure 8A:
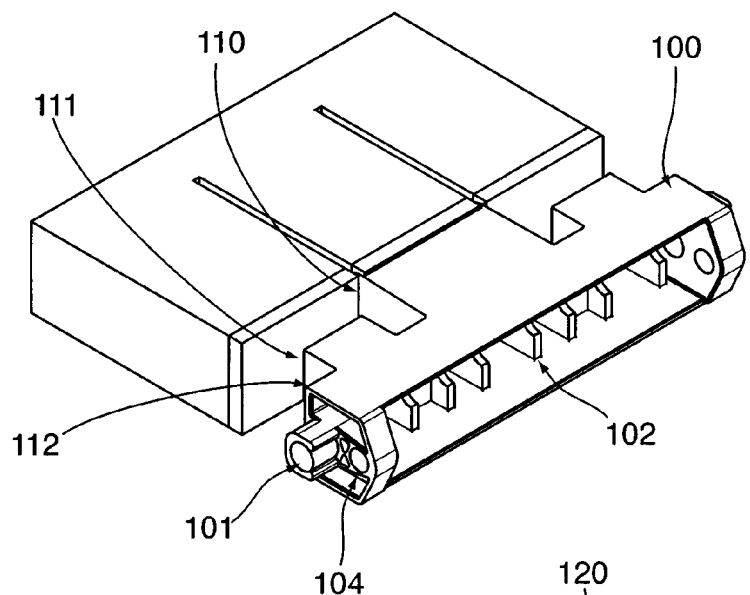
FIG. 8 (comprising FIGS. 8a, 8b, 8c) is a collection of views of the impactor piston and the energy absorbing member.
Figure 8B:
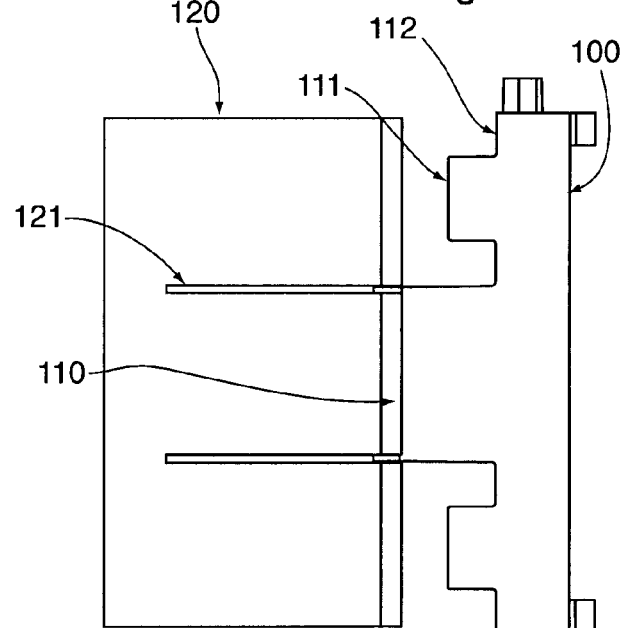
Figure 8C:
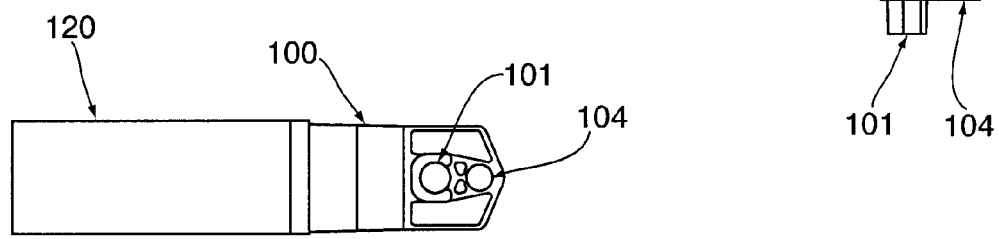
Figure 9A:
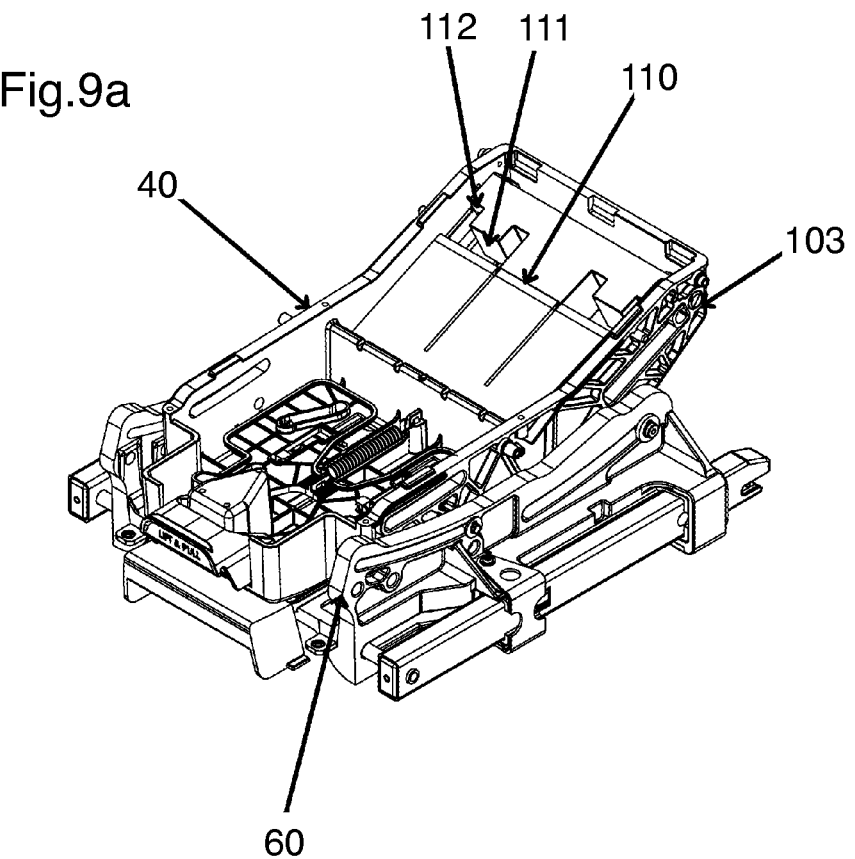
FIG. 9 (comprising FIGS. 9a, 9b, 9c, 9d) is a collection of views of the sled assembly mounted to the base assembly.
Figure 9B:
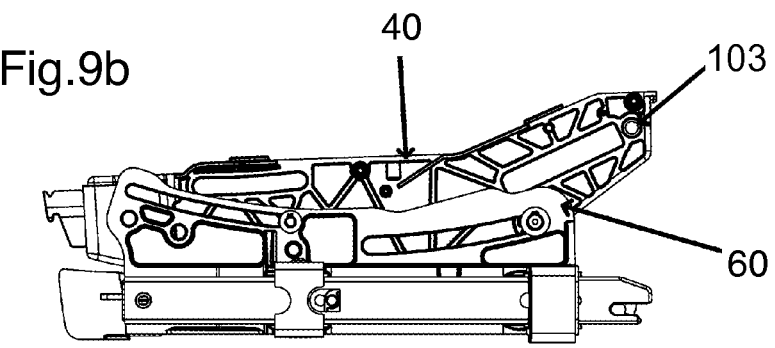
Figure 9C:
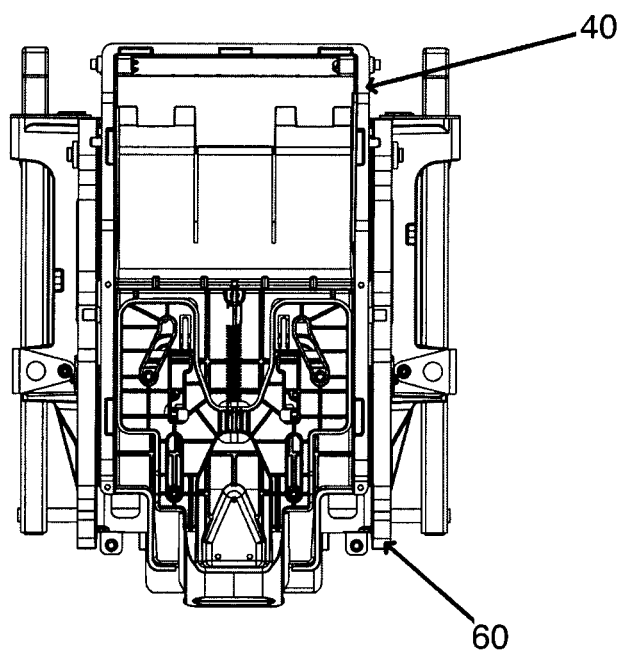
Figure 9D:
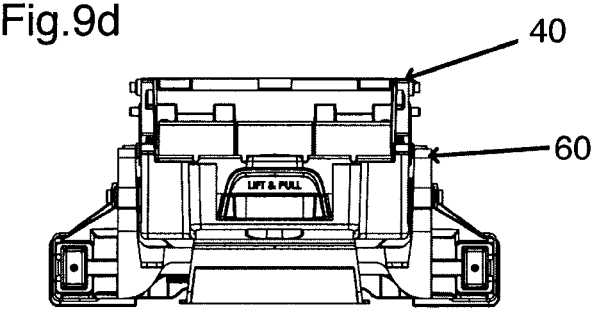

Preferably, the modular energy absorber includes an impactor piston 100 and a monolithic energy absorbing member 120. The impactor piston 100 includes a pair of substantially parallel planar sides, substantially parallel upper and lower planar faces, and an impactor bar channel 101 (see FIG. 8) that extends through the impactor piston 100 between the sides thereof. The impactor piston 100 may also include a plurality of impactor bar teeth 102 (see FIG. 8) to add structural support to the impactor piston 100. The first slide rod 42 extends through the pair of first slide channels 46 and the impactor bar channel 101. Therefore, the impactor piston 100 moves relative to the sled assembly 40, towards the energy absorbing member 120, as the seat body assembly 20 moves relative to the sled assembly 40.

The sides of the impactor piston 100 are disposed in close proximity to the sled side walls 48 to keep the impactor piston 100 in alignment with the sled side walls 48. The impactor piston 100 is supported along its lower planar face by the planar sled floor 55 of the sled assembly compartment 52, and is constrained against rotating within the sled assembly compartment 52 by the sled floor 55 and the lower surface of the sled cover 41. Further, the elongate axis of the first slide channels 46 is parallel to the sled cover 41 and the sled floor 55 (at least within the compartment 52). Therefore, the impactor piston 100 translates linearly along the first slide channels 46, towards the energy absorbing member 120, along a plane that is parallel to the sled floor 55, as the seat body assembly 20 moves relative to the sled assembly 40.

The energy absorbing member 120 may comprise an energy-absorbing material that is formed in a monolithic layered honeycomb-like structure. Preferably, the energy-absorbing material is aluminum, but may be any type of deformable material.

The energy absorbing member 120 includes a leading end that is disposed proximate the impactor piston 100, a terminating end that is disposed against the intermediate wall 54, and upper and lower faces that extend between the leading and terminating ends. Preferably, the upper and lower faces are substantially planar, and are parallel to each other. Further, the intermediate wall 54 may include teeth that retain the terminating end of the energy absorbing member 120 within the compartment 52.

The energy absorbing member 120 is supported substantially along its entire lower planar face by the planar sled floor 55 of the sled assembly compartment 52. Therefore, the impactor piston 100 translates along a plane that is parallel to the sled floor 55 and the planar faces of the energy absorbing member 120 as the seat body assembly 20 moves relative to the sled assembly 40.

To retain the impactor piston 100 proximate the rear end of the first slide channels 46, as shown in FIG. 6, until the seat 10 is exposed to impact forces (the "pre-impact position"), the impactor piston 100 may include shear pin apertures 104 adjacent each end of the bar channel 101, and the sled assembly 40 may include shear pins 103 (see FIG. 9) that extend from the sled side walls 48 into the shear pin apertures 104. The shear pins 103 may be made of metal, plastic, or other material that allows the shear pins 103 to break when the seat 10 is exposed to impact forces that are typically experienced in a motor vehicle collision. In the pre-impact position, the impactor piston 100 may be separated from the energy absorbing member 120 or may rest gently against the leading end of the energy absorbing member 120.

Preferably, the leading end of the impactor piston 100 includes a plurality of impactor stages that engage the leading end of the energy absorbing member 120 and are configured to transfer energy to the energy absorbing member 120 at different rates. As shown in FIG. 6, the impactor piston 100 may comprise a first stage impactor 107 that is configured to axially deform and transfer energy to a first portion of the energy absorbing member 120, a second stage impactor 108 that is configured to axially deform and transfer energy to a second portion of the energy absorbing member 120, and a third stage impactor 109 that is configured to axially deform and transfer energy to a third portion of the energy absorbing member 120.

In the embodiment shown, the first stage impactor 107 comprises a primary planar impactor surface 110 (see FIGS. 8 and 9) that is disposed proximate the centre of the impactor piston 100 and is configured to engage the leading end of the energy absorbing member 120. The second stage impactor 108 comprises a pair of secondary planar impactor surfaces 111 (see FIGS. 8 and 9) that are disposed on opposite sides of the primary impactor face and is configured to engage the leading end of the energy absorbing member 120. The third stage impactor 109 comprises a pair of tertiary planar impactor surfaces 112 (see FIGS. 8 and 9) that are disposed on opposite sides of the secondary impactor faces and is configured to engage the leading end of the energy absorbing member 120. As shown in FIG. 7, the impactor stages 107, 108, 109 may be enclosed by a skirt that surrounds at least the leading end of the energy absorbing member 120 to further maintain the impactor piston 100 in alignment with the energy absorbing member 120.

The first stage impactor 107 is longer than the second stage impactor 108. Therefore, the second stage impactor 108 is configured to begin transferring energy to the second portion of the energy absorbing member 120 (via the secondary planar impactor surfaces 111) after the first stage impactor 107 begins transferring energy to the first portion of the energy absorbing member 120 (via the primary impactor surface 110). The second stage impactor 108 is longer than the third stage impactor 109. Therefore, the third second stage impactor 109 is configured to begin transferring energy to the third portion of the energy absorbing member 120 (via the tertiary impactor surfaces 112) after the second stage impactor 108 begins transferring energy to the second portion of the energy absorbing member 120.

The energy absorbing member 120 may also include at least two slits 121 that extend from the leading end towards the terminating end. Preferably, the slits extend part-way from the upper face towards the lower face, but do not extend into the lower face, to thereby maintain the monolithic structure of the energy absorbing member 120. Further, the slits 121 may be aligned with the lateral extent of the first stage impactor 107 to thereby confine the forces that are applied to the energy absorbing member 120 by the first stage impactor 107 to the first portion of the energy absorbing member 120.

As shown, the surface area of the impactor surface 110 of the first stage impactor 107 is less than the combined surface area of the impactor surfaces 110, 111 of the first and second stage impactors 107, 108. Therefore, the impactor piston 100 is configured to deform the energy absorbing member 120 at a lower axial rate when the second stage impactor 108 engages the energy absorbing member 120 than when only the first stage impactor 107 engages the energy absorbing member 120. Similarly, the combined surface area of the impactor surfaces 110, 111 of the first and second stage impactors 107, 108 is less than the combined surface area of the impactor surfaces 110, 111, 112 of the first, second and third stage impactors 107, 108, 109. Therefore, the impactor piston 100 is configured to deform the energy absorbing member 120 at a lower axial rate when the third stage impactor 109 engages the energy absorbing member 120 than when only the second stage impactor 108 engages the energy absorbing member 120. Accordingly, the modular energy absorber is configured to provide a step-wise-increasing form of energy absorption as the seat body assembly 20 moves away from the pre-impact position.

As will be apparent, the impactor piston 100 need not comprise three impactor stages, and the impactor stages need not each comprise planar impactor surfaces. Rather, the impactor piston 100 may have any number of impactor stages, and the impactor stages may have other shapes and relative sizes, depending on the dampening profile desired. However, preferably the layout of the staged impactors is symmetrical about the centre of the impactor piston 100 to allow for even distribution of forces and to encourage linear movement of the impactor piston 100 along the first slide channels 46.

When a vehicle having the seat 10 stops suddenly, such as in a vehicle collision, and the seat 10 is installed into the vehicle in a forward-facing direction, the shear pins 103 will break apart due to the summation of impact forces applied to the shear pins 103 from the momentum of the child and the sudden stopping of the sled assembly 40 and the base assembly 60 (the latter being rigidly secured to the vehicle). When the shear pins 103 break, the seat body assembly 20 continues to travel forwards while the base assembly 60 and the sled assembly 40 stop suddenly. The movement of the seat body assembly 20 relative to the sled assembly 40 causes the impactor piston 100 to slide within the rear slide channels 46 and the second slide rod 44 to slide unopposed within the front side channels 47.

As the impactor piston 100 slides forward, it engages the leading end of the energy absorbing member 120, thereby causing the impact forces on the child to be transferred through the impactor piston 100 to the energy absorbing member 120, and the energy absorbing member 120 to step-wise deform as it dissipates the impact forces. Depending on the weight of the child and the seat body assembly 20, the impactor piston 100 may cause varying amounts of the energy-absorbing material to collapse, thereby bringing the child and child seat body assembly 20 to a more gradual stop than normal.

Since the impactor piston 100 translates linearly along the first slide channels 46, instead of rotating about the slide channels 46, as the impactor piston 100 moves towards the energy absorbing member 120, the impactor piston 100 is able to efficiently distribute the impact force to the entire leading end of the energy absorbing member 120. Furthermore, since the modular energy absorber is enclosed by the sled cover 41, the sled side walls 48, the sled end wall 49, the intermediate wall 54 and the sled floor 55 of the sled assembly 40, lateral, upwards, or downwards movement of the impactor piston 100 and the energy absorbing member 120 is limited. Therefore, impact forces on the child are efficiently transferred to the energy absorbing member 120.

Preferably, the sled assembly 40 is formed from a lightweight material, such as magnesium alloy or plastic, and has a uni-body construction to impart strength and lightness to the sled assembly 40. Similarly, the seat base assembly 60 preferably also has a uni-body construction and is formed from a magnesium alloy. By eliminating weld points in the construction of assemblies 40 and 60, each assembly 40 and 60 is strengthened allowing impact forces to flow through the seat 10 without causing damage to elements of the seat 10 other than the shear pins 103 and the energy absorbing member 120. Although it is preferable that the impactor piston 100 move towards the energy absorbing member 120, in one variation the energy absorbing member 120 may move towards the impactor piston 100, to thereby collapse the energy absorbing material.

Figure 10:
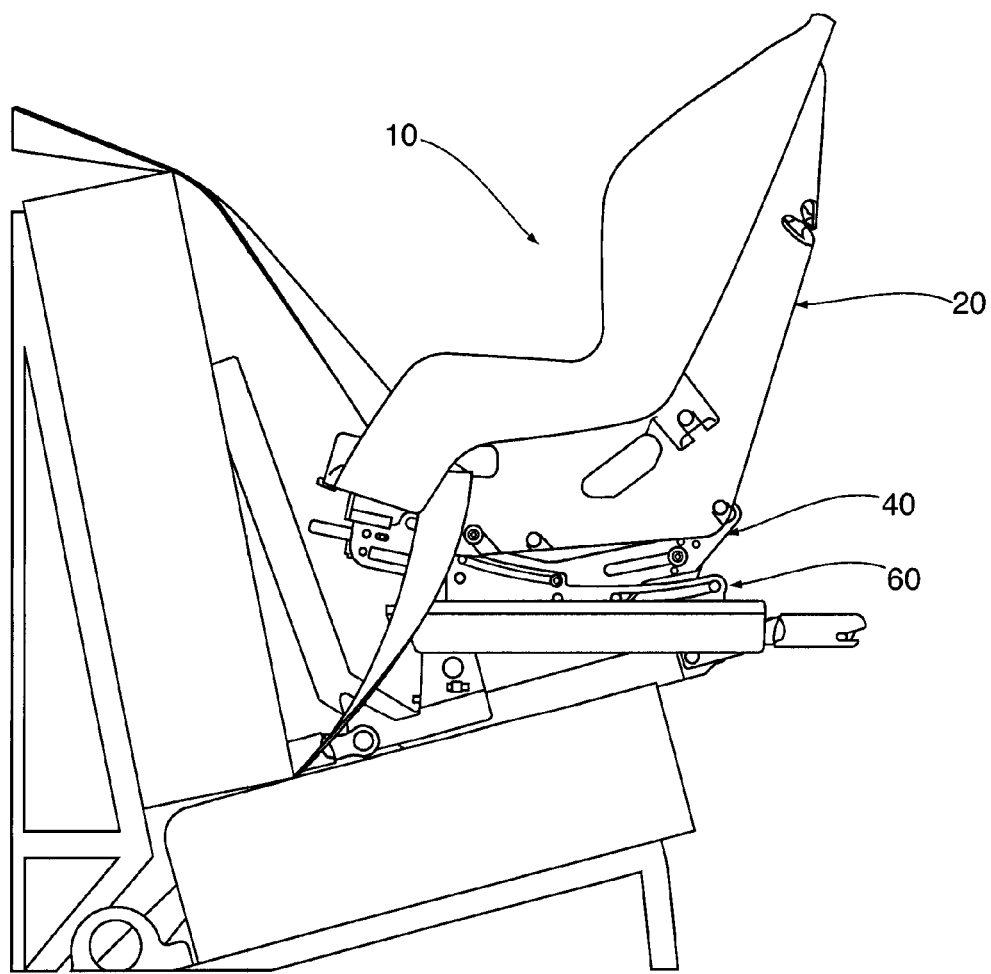
FIG. 10 is a side plan view of the seat installed in a vehicle seat in a rear-facing position.
Figure 11:
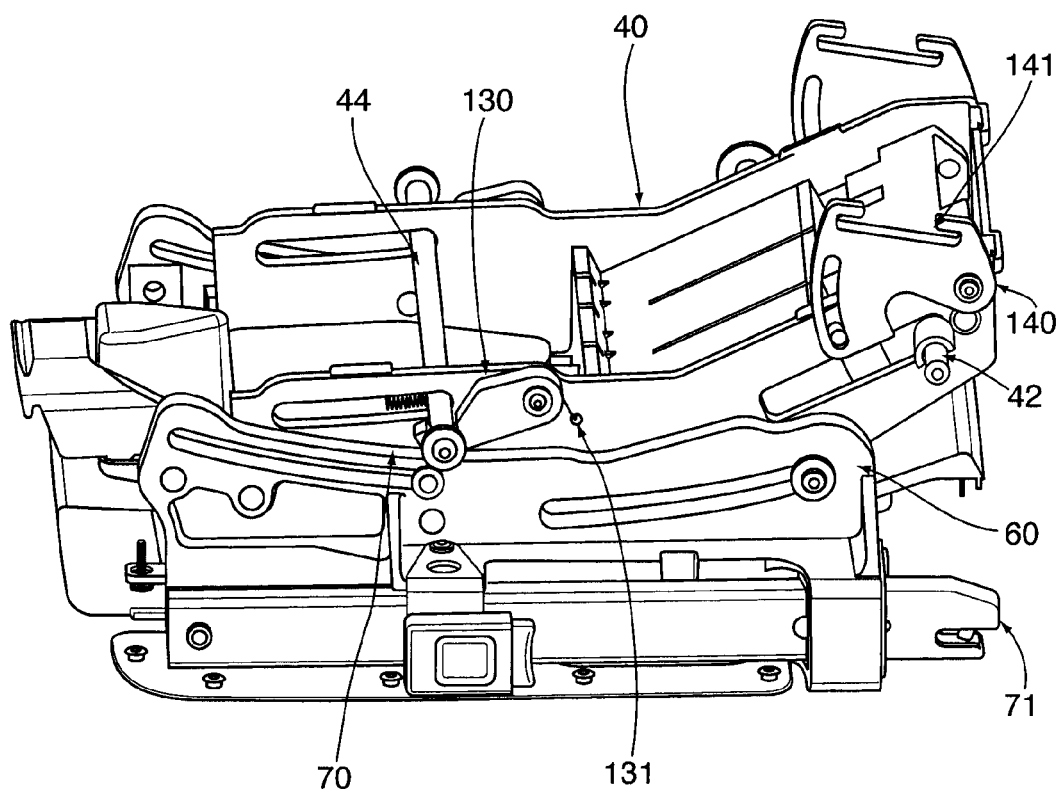
FIG. 11 is a side perspective view of the child safety seat showing additional safety features thereof.

The safety seat 10 may be installed in a vehicle in either a rear-facing direction via seat belts threaded through the seat 10 (see FIG. 10), or a forward-facing direction via bracing arms 71 (see FIG. 11) that extend from the base assembly 60 towards the vehicle seat. When the seat 10 is installed in a rear-facing direction, it is desirable to be able to disable the translation movement of the impactor piston 100 to prevent re-coil movement of the seat 10 after the impact. Also, according to existing safety standards, when a child seat is installed in a rear-facing direction it must be reclined more than when installed in a forward-facing direction. Therefore, as shown in FIG. 11, preferably the seat 10 also includes rear dampening locks 130 each pivotally coupled to a respective exterior side of the sled side wall 48 and are configured to engage lock guide edge 70 of the base assembly 60. As the sled assembly 40 is moved to a reclined position, as previously described, the dampening locks 130 are biased to ride along the guide edge 70 by a rear dampening lock spring 131 (shown in FIG. 4). Upon the sled assembly 40 being locked into a fully reclined position, the dampening locks 130 will be urged upwards by the guide edge 70 into a position whereby they capture a respective end of the second slide rod 44, thereby preventing the second slide rod 44 from moving during impact. Since the second slide rod 44 is secured to seat body assembly 20, as is first slide rod 42, the seat body assembly 20 will thereby be prevented from moving relative to the sled assembly 40 during vehicular impact.

When the seat is installed in a forward facing direction, the seat 10 will be in a non-reclined position in which the dampening locks 130 will not engage the second slide rod 44. However, in vehicles that do not feature child seat safety mounting parts, such as ISOFIX components, the seat 10 may be secured in the vehicle by strapping the vehicle seat belts through portions of the seat 10. In such an installation, it also may be desirable to disable the impactor piston 100. Therefore, as shown in FIG. 11, preferably the seat 10 also includes front dampening locks 140 through which the vehicle seat belt may be threaded.

The front dampening locks 140 are normally biased upwards away from the first slide rod 42 by a front dampening lock spring 142 (shown in FIG. 4). However, if a vehicle seat belt is threaded through channel 141 of the front dampening locks 140 and the seat belt is tightened, the dampening locks 140 will be urged downwards to capture a respective end of the first slide rod 42 and thereby prevent the seat body assembly 20 from moving relative to the sled assembly 40 during a vehicular impact.

The invention claimed is:

1. A child safety seat comprising:
   a seat base assembly;
   a sled assembly coupled to the seat base assembly and
   a seat body assembly slidably coupled to the sled assembly,
   wherein the sled assembly is configured to allow linear movement of the seat body assembly relative to the sled assembly when the seat is exposed to impact forces, and includes a modular energy absorber configured to reduce the impact forces on an occupant of the seat body assembly, and
   wherein the seat base assembly is configured to selectively allow the sled assembly to move relative to the seat base assembly independently of the movement of the seat body assembly relative to the sled assembly.

2. The child safety seat according to claim 1, wherein the modular energy absorber comprises an impactor piston and a monolithic energy absorbing member, and the impactor piston is configured to move relative to the energy absorbing member as the seat body assembly moves relative to the sled assembly.

3. The child safety seat according to claim 2, wherein the modular energy absorber is configured to provide a stepwise-increasing form of energy absorption as the seat body assembly moves relative to the sled assembly.

4. The child safety seat according to claim 2, wherein the modular energy absorber includes a skirt surrounding an end of the energy absorbing member and configured to maintain the impactor piston in alignment with the energy absorbing member.

5. The child safety seat according to claim 2, wherein the sled assembly comprises a pair of sled side walls, a sled floor, a rear end wall disposed proximate a rear of the seat, and an intermediate wall disposed proximate a front of the seat, and the modular energy absorber is disposed within a sled assembly compartment defined by the sled side walls, the rear end wall, the intermediate wall and the sled floor.

6. The child safety seat according to claim 5, wherein the sled assembly is covered by a sled cover, and the impactor piston is constrained against rotation within the sled assembly compartment by the sled floor and a lower surface of the sled cover.

7. The child safety seat according to claim 5, wherein the impactor piston includes upper and lower faces and the impactor piston is supported along the lower face by the sled floor.

8. The child safety seat according to claim 2, wherein the sled assembly comprises a sled floor, the energy absorbing member is supported by the sled floor, and the impactor piston is configured to translate along a plane that is parallel to the sled floor as the seat body assembly moves relative to the sled assembly.

9. The child safety seat according to claim 8, wherein the sled assembly comprises a pair of sled side walls that include elongate slide channels, and the impactor piston is configured to translate linearly along the elongate slide channels, towards the energy absorbing member, along the plane as the seat body assembly moves relative to the sled assembly.

10. The child safety seat according to claim 9, wherein the impactor piston includes an impactor channel extending therethrough, and the seat body assembly is coupled to the sled assembly via a slide rod that extends through one of the elongate slide channels and the impactor channel.

11. The child safety seat according to claim 10, wherein the impactor piston includes shear pin apertures disposed adjacent the impactor channel, and the sled assembly includes shear pins extending from the sled side walls into the shear pin apertures, the shear pins being configured to break when the seat is exposed to an impact force.

12. The child safety seat according to claim 2, wherein an end of the impactor piston includes a plurality of impactor stages that engage an end of the energy absorbing member, each impactor stage being configured to transfer energy to the energy absorbing member at different rates.

13. The child safety seat according to claim 12, wherein a first of the impactor stages comprises a primary planar impactor surface disposed proximate the centre of the impactor piston and configured to transfer energy to a first portion of the energy absorbing member, and a second of the impactor stages comprises a pair of secondary planar impactor surfaces disposed on opposite sides of the primary impactor face and configured to transfer energy to a second portion of the energy absorbing member.

14. The child safety seat according to claim 13, wherein the second of the impactor stages is configured to begin transferring energy to the second portion of the energy absorbing member after the first of the impactor stages begins transferring energy to the first portion of the energy absorbing member.

15. The child safety seat according to claim 14, wherein the impactor piston is configured to deform the energy absorbing member at a lower axial rate when the second of the impactor stages engages the energy absorbing member than when only the first of the impactor stages engages the energy absorbing member.

16. The child safety seat according to claim 13, wherein the energy absorbing member includes slits aligned with a lateral extent of the first of the impactor stages and configured to confine forces applied to the energy absorbing member by the first of the impactor stages to the first portion of the energy absorbing member.

17. The child safety seat according to claim 2, wherein the energy absorbing member comprises an energy-absorbing material having a monolithic layered honeycomb-like structure.

18. The child safety seat according to claim 17, wherein the energy-absorbing material is aluminum.

19. The child safety seat according to claim 1, wherein the sled assembly comprises a pair of sled side walls, the seat base assembly comprises a pair of base side walls located laterally outwards from the sled side walls, each sled side wall includes a plurality of through-holes, and each base side wall includes a plurality of arcuately-shaped base channels each aligned with a respective one of the through-holes.

20. The child safety seat according to claim 19, wherein the sled assembly includes base rods each extending through a respective one of the through-holes and captured within a respective one of the base channels and configured to allow the sled assembly to move relative to the seat base assembly.

21. The child safety seat according to claim 20, wherein the orientation of the base channels enables an incline angle of the seat body assembly to be manually adjusted.

22. The child safety seat according to claim 19, wherein the seat further comprises a locking assembly configured to selectively allow the sled assembly to be rotated relative to the seat base assembly and to retain the sled assembly in one of a plurality of predetermined angular positions relative to the seat base assembly.

23. The child safety seat according to claim 22, wherein each said base side wall includes a plurality of apertures, the locking assembly comprises a guide plate and at least one locking pin, the guide plate includes a guide channel, a head of the locking pin is captured within the guide channel, and the guide channel is configured to maintain the locking pin in one of the locking apertures in accordance with a position of the guide plate.

24. The child safety seat according to claim 1, wherein the sled assembly comprises a pair of sled side walls, the sled side walls include elongate slide channels disposed in respective regions thereof, and the seat body assembly is secured to the sled assembly via slide rods extending through the elongate slide channels.

25. The child safety seat according to claim 24, wherein each slide rod is slidably retained within a respective one of the elongate slide channels, and the seat body assembly is configured to translate linearly relative to the sled assembly via the slide rods and the elongate slide channels.

* * * * *